UNITED STATES PATENT OFFICE.

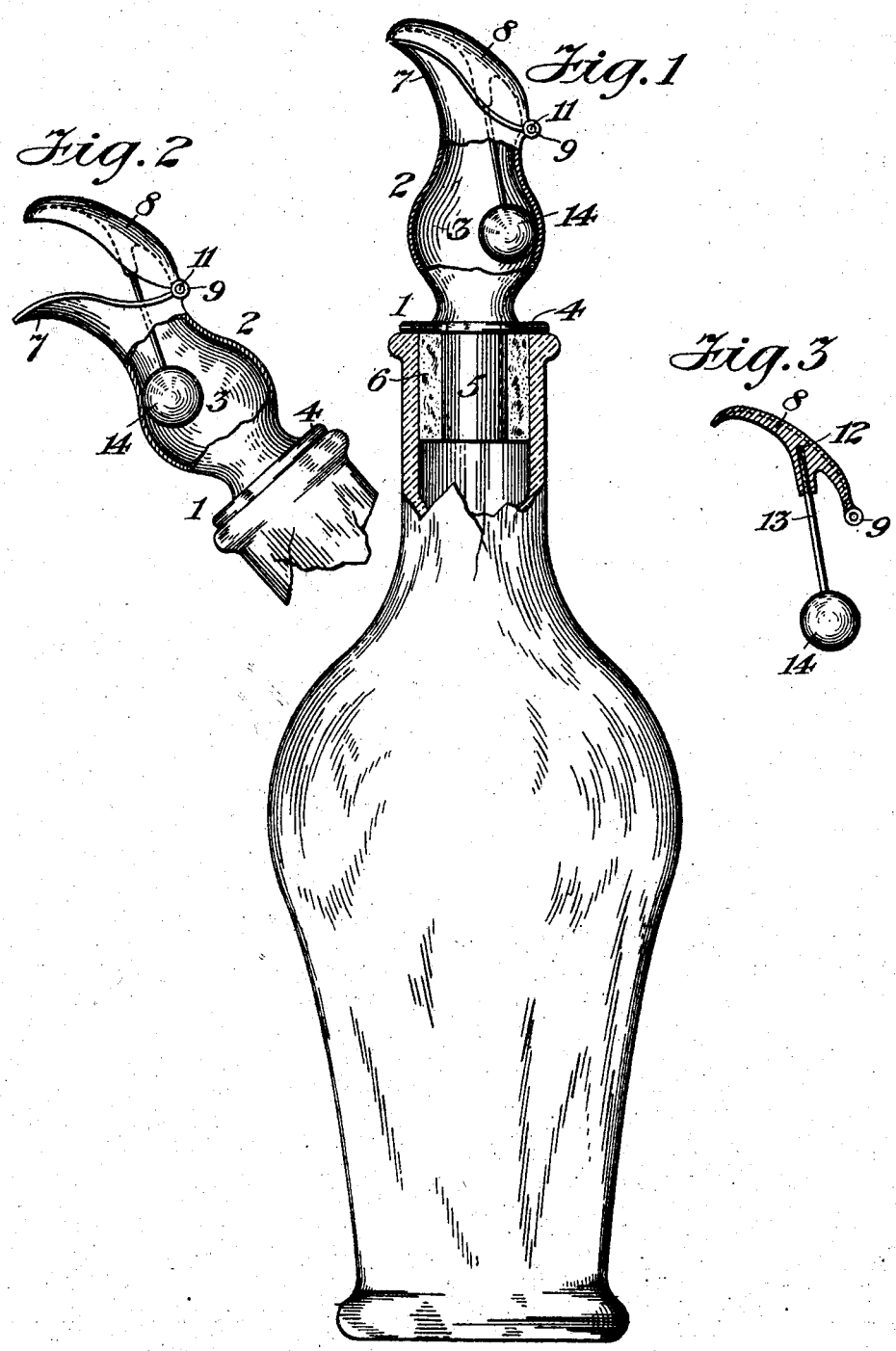

MICHEAL SALOTTO, OF RYE, AND GUSTAVE GALBRUN, OF VALHALLA, NEW YORK.

BOTTLE-STOPPER.

No. 800,405.	Specification of Letters Patent.	Patented Sept. 26, 1905.

Application filed March 31, 1905. Serial No. 252,997.

*To all whom it may concern:*

Be it known that we, MICHEAL SALOTTO, a citizen of the United States, and a resident of Rye, and GUSTAVE GALBRUN, a citizen of the Republic of France, and a resident of Valhalla, in the county of Westchester and State of New York, have invented certain new and useful Improvements in Bottle-Stoppers, of which the following is a specification.

Our invention relates to stoppers.

It has for its object to provide a stopper for bottles, &c., comprising a neck at its lower end adapted to fit tightly in the mouth of a bottle, a hollow body portion, a mouth portion at the upper end thereof covered by a lid adapted to be turned on its pivot by a gravity device to open when the bottle is tilted and closed by said gravity device when the bottle is placed in an upright position, this being for the purpose of preventing dust, dirt, or other foreign matter from getting into the bottle and also to obviate the necessity for removing the stopper to pour out the contents of the bottle.

It has for a further object to provide a device of the character set forth embodying advantages in point of simplicity, inexpensiveness, durability, and automatic operation.

In the drawings, Figure 1 is a side view, partly broken away and partly in section to show the parts of the device. Fig. 2 is a similar view showing the bottle tilted and the lid open. Fig. 3 is a detail sectional view of the lid and showing the manner of adjustably suspending the gravity-weight.

Corresponding parts in all the figures of the drawings illustrating our invention are designated by the same reference characters.

Referring to the drawings, 1 designates our stopper, shown in the drawings for the purpose of illustrating as inserted into the neck of a bottle. The body 2 of the stopper has a central enlarged or bulged portion 3, below the central portion a flange 4, adapted to rest on top of the bottle, and a neck portion 5, having a flexible washer 6 thereon to adapt it to fit tightly in the mouth of a bottle, and above the central portion with a protruding mouth 7. The lid 8 for the mouth is provided with ears 9 at its rear end, embracing an ear on the rear of the body, and a pivot-pin 11, passing through said ears to pivot said lid. A screw-threaded socket 12 is provided on the under side of the lid near its rear end and receives the upper screw-threaded end of a rod 13, which slants toward the rear of the body and has a gravity-weight 14 on its lower end. By this arrangement the weight may be raised or lowered to properly position it in the body, so that the extent to which the lid may open can be regulated, it being understood that when it is raised to its fullest extent it will contact with the walls of the narrower portion of the body, allowing the lid to be opened slightly, and when lowered it will come into contact with the walls of the widest portion of the body portion, allowing the lid to open to its fullest extent.

The operation is as follows: To open the lid for the purpose of pouring out its contents, the bottle is tilted to one side, as shown by Fig. 2, and the weight gravitates toward the front until it comes into contact with walls of the body, and to close the lid the bottle is placed in an upright position, which causes the weight to gravitate toward the rear, closing the lid.

We do not wish to be understood as limiting ourselves to the precise details and arrangements of parts shown and described, but reserve the right to all modifications within the scope of our invention.

Having thus described our invention, what we claim is—

1. A bottle-stopper comprising a hollow body having a mouth, a lid pivoted on said body and covering said mouth and an adjustable gravity device for opening and closing said lid, substantially as described.

2. A bottle-stopper comprising a hollow body having a mouth, a lid pivoted on said body and covering said mouth and an adjustable gravity-weight suspended from the cover and adapted to come into contact with the walls of the body to limit the opening of the lid, substantially as described.

3. A bottle-stopper comprising a hollow body having a mouth, a lid pivoted on said body and covering said mouth and a gravity-weight adjustably suspended from the lid and adapted to open and close said lid, substantially as described.

4. A bottle-stopper comprising a hollow body having a mouth, a lid pivoted on said body and covering said mouth, a threaded socket on said cover, a gravity-weight suspended on the lower end of a rod the upper end of which adjustably engages the screw-threaded socket on the cover, substantially as described.

Signed at Rye, in the county of Westchester and State of New York, this 13th day of March, A. D. 1905.

MICHEAL SALOTTO.
GUSTAVE GALBRUN.

Witnesses:
   WILBUR F. HENDRIE,
   PRESTON PARKER.